Dec. 21, 1954     T. A. ÖDMAN     2,697,330
REVERSIBLE HYDRAULIC COUPLING
Filed June 1, 1950     3 Sheets-Sheet 1
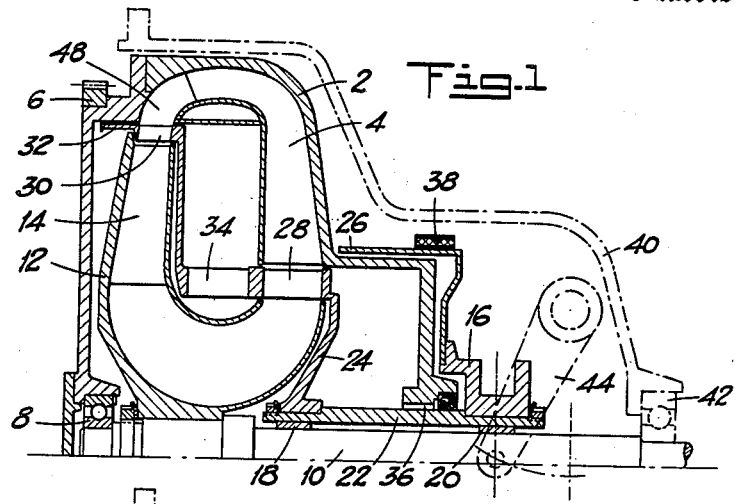
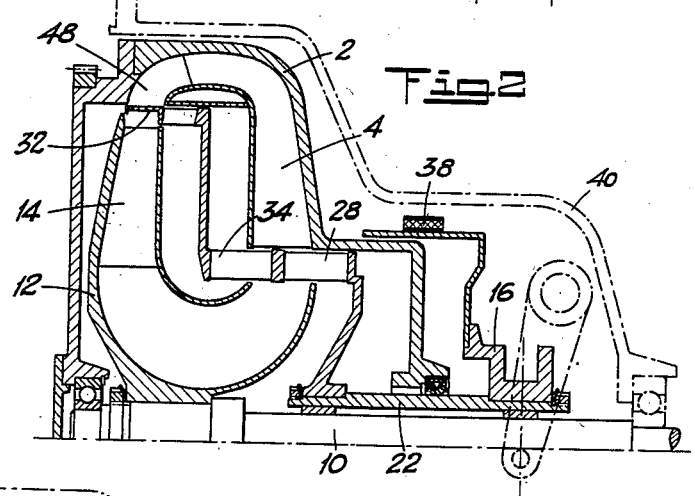
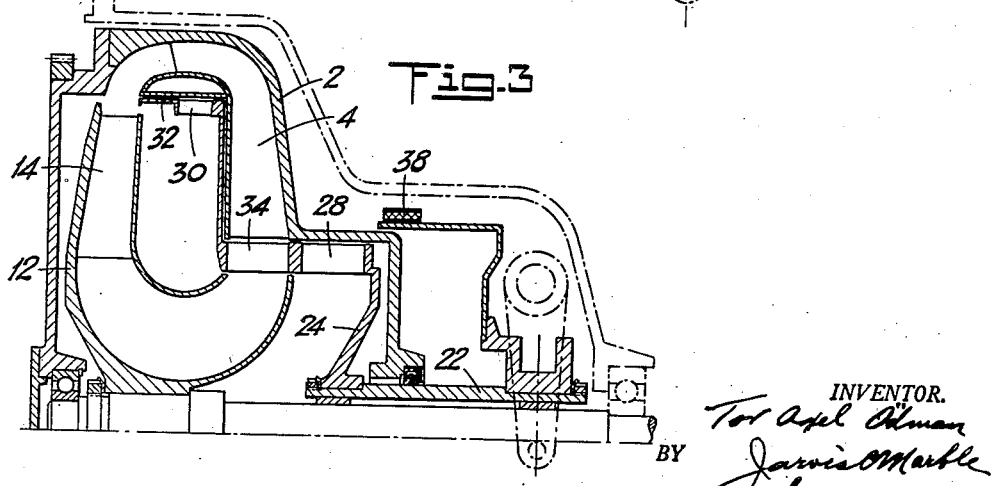
INVENTOR.
Tor Axel Ödman
BY Jarvis Marble
his Attorney

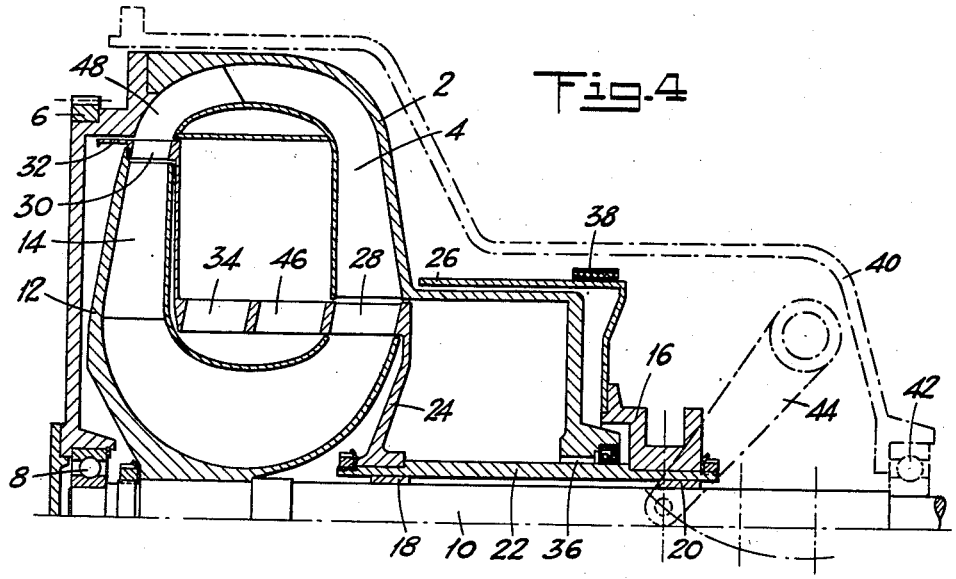

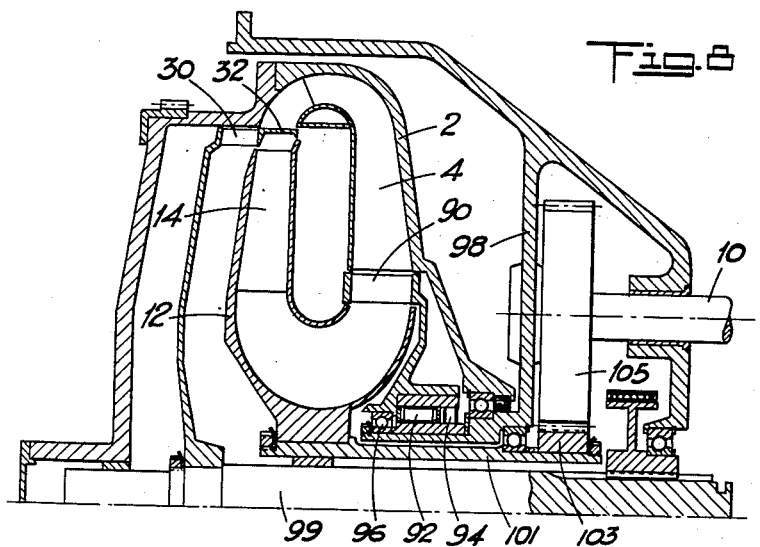
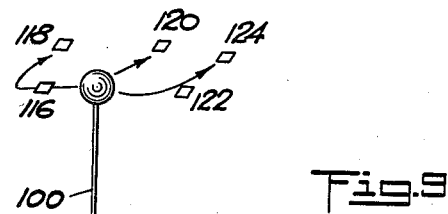
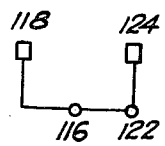
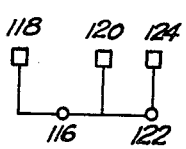

United States Patent Office 2,697,330
Patented Dec. 21, 1954

2,697,330

REVERSIBLE HYDRAULIC COUPLING

Tor A. Ödman, Stockholm, Sweden, assignor, by mesne assignments, to Jarvis C. Marble, New York, N. Y., Leslie M. Merrill, Westfield, N. J., and Percy H. Batten, Racine, Wis., as trustees Application June 1, 1950, Serial No. 165,388

Claims priority, application Sweden June 15, 1949

11 Claims. (Cl. 60—54)

The present invention relates to hydrodynamic power transmissions comprising hydraulic couplings or converters of the closed circuit type in which the direction of motion of the secondary shaft may be reversed.

In view of the efficiency and the input torque characteristic obtainable by the invention, it is particularly applicable to reversible hydraulic couplings or converters for ships and satisfies all the demands for simplicity, easy control and cheapness in manufacture that may be made upon such apparatus, although it is evident that the invention is not restricted to this special range of use.

It has previously been known to reverse the direction of motion of the secondary shaft during operation by changing the blading arrangement in the hydraulic circuit, e. g. by introducing and retracting a ring of reverse blades arranged between the pump part and the turbine part in the circuit. However, the known devices of this kind suffer from certain deficiencies which restrict their practical use. These deficiencies are (1) bad efficiency in general or either at forward or at reverse drive, due to which the utilized power or the speed of the driving engine must become different at forward drive and at reverse drive, (2) absence of a neutral position and (3) a complicated technical design in general. Moreover, in the known constructions for tow-boats, fishing-boats and similar boats one is obliged to drive the hydrodynamic power transmission with low efficiency when towing nets or the like in which case the speed of the boat should be as low as about 1 to 3 knots, or 10 to 20% of the normal speed. In engines the speed of which is regulatable within narrow limits, e. g. diesel engines, it is impossible with couplings of normal construction to maintain such a low speed of the boat during continuous drive and at the same time a high efficiency, because the input power is dependent substantially upo nthe speed $n_1$ of the pump and the efficiency which, as is known, varies with the speed ratio $n_2n_1$, in which $n_2$ is the speed of the turbine or output member. Thus, the power required will be of the same magnitude as at full speed because, on the whole, the pump speeds are the same in both drive positions, and furthermore the efficiency becomes low due to the low propeller speed $n_2$.

If the reversible power transmission is made as a hydraulic converter with a certain torque conversion at forward drive, which is advantageous if the boat is to be used for towing at a moderately reduced speed, the diesel engine likewise, on the whole, operates with constant power and constant speed. A still more reduced speed down to 1 to 3 knots cannot, however, be maintained continuously with such a transmission if the low speed is combined with a low power consumption of the propeller shaft because an amount of power, which is too great in relation to the one required for the propulsion of the boat at the low speed in question, is supplied to the propeller via the converter. As a matter of fact, one may resort to variable filling to reduce the transmitted power at constant input speed, but such a measure is complicated and the control procedure will take place relatively slowly.

The object of the present invention is to eliminate the above-mentioned deficiencies and to effect by means of a novel blade system of simple construction a reversible coupling or converter with equal or almost equal input torque or number of revolutions at full speed, forward speed and in reverse, as well as a definite neutral position between said speeds, and which also can be designed in such a manner that a considerably reduced amount of power can be taken out through the secondary shaft, maintaining the normal number of revolutions of the primary shaft.

To this end the invention contemplates the provision of a novel form and arrangement of pump, turbine and reversing blading in a hydrodynamic transmission of the kind under consideration, inclusive of an axially shiftable member provided with an annular valve portion, as will be more fully pointed out in the ensuing portion of this specification in which different embodiments of the invention, illustrated by way of example but without limitation in the accompanying drawings, are described.

In the drawings:

Fig. 1 shows diagrammatically a section through a combined coupling and converter set for reverse drive, applying the principles of the invention.

Fig. 2 shows the same embodiment set for neutral position.

Fig. 3 shows the same embodiment set for forward drive.

Fig. 4 shows an alternative embodiment of the invention set for reverse drive.

Fig. 5 shows sections developed in the plane of the paper for illustrating the design of the blades and certain properties as regards the liquid flow in the circuit at forward drive as a converter and with full engine power.

Fig. 6 shows similar sections for illustrating the liquid flow in the circuit at reverse drive.

Fig. 7 shows similar sections for illustrating the flow process at forward drive with reduced power.

Fig. 8 shows a third embodiment of the invention set in neutral position.

Fig. 9 shows an example of a device for operating a coupling according to Figs. 1 and 4, Fig. 10 shows diagrammatically the different positions of the hand lever for a coupling according to Fig. 1.

Fig. 11 shows in the same manner as Fig. 10 the positions of the hand lever in an embodiment of the invention according to Fig. 4.

In Fig. 1, the reference numeral 2 designates a rotatable casing carrying a ring of pump blades 4 and driven by an engine via a coupling ring 6. Within the casing which constitutes the primary member of the power transmission device, a bearing 8 supports one end of the secondary member which comprises a shaft 10 carrying a turbine disk 12 with turbine blade ring 14. A reactor member comprising a sleeve 22 with disk 24 is rotatably mounted relative to said secondary shaft at 18 and 20, and is at the the same time axially shiftable by means of a fork collar 16 which in its turn may be actuated by a control lever. The disk 24 carries reverse blade rings 28 and 30, the annular valve portion 32 and the vane ring 34 of which the vanes may consist of a small number of profiled spokes which, introduced into the circuit according to the position shown in Fig. 3, let the liquid flow through the vane ring without any significant influence upon the flow process.

According to an alternative embodiment the vanes of the ring 34 consist of reaction guide blades which are used when the circuit at forward drive is to operate with torque conversion and for this reason are designed in such a manner that the direction of the flow is altered while part of the pressure energy is converted into velocity.

Externally of the sleeve 22 a bearing 36 supports the rotating casing in order to center and support the parts of the device relative to each other.

Outside the circuit the sleeve 22 is provided with a brake device, in order to lock the same or permit its free rotation, as desired. In the embodiments shown in Figs. 1 to 4 this device is constructed as a brake drum 26 on the sleeve 22 and a brake band 38 fixed to the frame 40. The frame also carries a bearing 42 for the secondary shaft as well as a suitable control device for shifting sleeve 22 in the axial direction, said control device being in the drawing shown as a fork 44 engaging the grooves of the fork collar 16.

The axially shiftable sleeve 22 permits different settings of the blade system in the hydraulic circuit. In the position shown in Fig. 1, the reverse blade rings 28 and 30 are introduced in the circuit and the device is thus set for drive. In order to alter the direction of the liquid flow, these blade rings must be braked with the braking device 26 and 38, or held stationary in some other way, e. g. with a claw coupling or the like. If now the sleeve 22 is shifted a distance corresponding to the width of the circuit at 48, the position is obtained which is shown in Fig. 2, the circuit being shut off by the valve portion 32. The flow of liquid is prevented and no torque beyond that which is transmitted due to mechanical or liquid friction actuates the secondary shaft 10. In other words, the sleeve 22 is in this case in the neutral position. In this position it is fundamentally just the same whether the sleeve is rotating or stationary.

Upon further shifting of the sleeve to the right relative to the position shown in Fig. 1, the position is obtained which is shown in Fig. 3. In this position the channel at the turbine inlet as well as at the pump inlet is fully open, and the liquid in the circuit has the possibility of circulating under the influence of the rotation of the pump. If the vanes at 34 consist of a ring of spokes the device will function as a coupling. If, on the other hand, the vanes at 34 consist of reaction guide blades, hydraulic torque conversion is obtained with sleeve 22 braked, while with the sleeve running freely the device operates as a coupling.

An alternative embodiment of the invention is shown in Fig. 4. This device differs from the embodiment shown in Fig. 1 substantially in that, besides the reverse blade rings 28 and 30, the valve portion 32 and the vane ring 34, the disk 24 carries a further blade ring 46 adapted to be introduced between the turbine and the pump, said blade ring being according to the invention provided with blades permitting low speed of a ship equipped with this device, at reduced engine power but with a high number of revolutions $n_1$ of the engine or pump.

In this embodiment, there is still another position of the shiftable sleeve 22 in which the additional blade ring 46 is located in the circuit. When this blade ring 46 is held stationary, the device functions as a hydraulic converter with reduced power at constant input number of revolutions $n_1$, but when it is running freely the device functions as a pure hydraulic coupling.

Fig. 5 indicates the flow process at hydraulic drive with a ring of guide blades 34 introduced in the circuit in the above described blade system according to Figs. 1 and 4. The arrows 68 and 70 indicate the direction of motion of the pump and the turbine blade rings respectively. The arrow 50 indicates the absolute outlet velocity from the turbine blade and the arrow 52 the peripheral speed of the turbine at the outlet edge. This velocity is somewhat less than the peripheral speed of the pump at the inlet edge, which means that the speed ratio between the secondary and the primary shafts is less than 1. After having altered its direction in the guide blade 34, the direction and the velocity of the liquid flow have been changed from the values indicated by the arrow 50 to the values indicated by the arrow 56, while the relative inlet velocity becomes radially or almost radially directed when entering the pump blade system, as shown by the arrow 58.

The absolute outlet velocity from the pump, indicated by the arrow 60, gives, due to the difference in rate of rotation between pump outlet and turbine inlet, i. e. between the velocities 62 and 64, the relative inlet velocity 66 to the turbine. This velocity is not purely radial in the case shown, which, however, is compensated by the inlet edge of the turbine blade being rounded.

Fig. 6 shows normal drive at backward run, the pump blade ring rotating always in the direction of the arrow 68, while the turbine is moving in the opposite direction according to the arrow 72 under the influence of the guide blade rings 28 and 30 introduced in the circuit. The velocity 61 from the pump outlet is altered in the guide blade ring 30 to the velocity 74 and gives the relative inlet velocity 76 to the turbine, which velocity in this case has an almost radial direction. The absolute outlet velocity 78 from the turbine is altered in the guide blade to substantially varying speed ratios between the input velocity 82 to the pump.

For couplings, it is well known that the blades in the pump part and in the turbine part may advantageously be arranged radially. It is clear from Figs. 5 and 6 that the blades according to the present invention also may be arranged radially with advantage, although embodiments are possible in which more or less bent inlet and outlet edges may be more advantageous. However, in order to obtain a flat efficiency curve at drive as converter the inlet edges of all the blades should be rounded so that they give a good efficiency at varying angles of inlet due to substantially varying speed ratios between the inlet and output shafts.

The blade form shown in Fig. 7 refers to the embodiment of the invention according to Fig. 4 with the guide blade ring 46 introduced in the circuit, which corresponds to the fact that the boat is driven in forward direction with reduced engine power and thus at low speed. The blades in this ring alter the absolute outlet velocity 84 from the turbine to a velocity 86 which gives the relative inlet velocity 88 to the pump. From the blade plane it is clear that the liquid flow to the pump performs a strong self-rotating motion which means a reduced torque absorption in the pump and thus reduced power from the engine at an unchanged number of revolutions $n_1$.

From Fig. 6 it is also clear that the flow processes in the reverse blade rings become such that the ring 30, which is placed between the pump outlet and the turbine inlet, obtains a torque directed in the direction of rotation of the pump, while the other reverse blade ring 28, placed between the turbine and the pump, obtains a torque directed against the direction of rotation of the pump.

At forward drive as a hydraulic converter, a guide blade ring 34 (Fig. 5) is introduced in lieu of the reverse blade ring 28, said guide blade ring 34 being subjected by the working fluid to a torque tending to turn this ring against the direction of rotation of the pump and in this case also of the turbine at low speed ratios $n_2/n_1$. However, with increasing speed ratio between the turbine and the pump a drive position is obtained in which the reaction torque on the blade ring 34 becomes equal to zero and thereafter acts in the opposite direction. Therefore, if the guide blade ring 34 is mounted to free wheel, the device will at a further increased speed ratio work as a coupling. This is made possible in the simplest manner by providing, in a known manner, the guide blade ring 34 with a free-wheel coupling which permits it to rotate in the direction of the pump only.

As the rings 28 and 34 will alter the direction of the working medium and are locked for rotation in one and the same direction, viz. for rotation against the pump, these two rings may be replaced by a single blade ring, the blades of which are designed in such a manner that they can receive with good efficiency the liquid flow in the two separate directions 78 and 50 (Figs. 6 and 5 respectively), which is possible if the inlet edges are well rounded and the blade system is designed in other respects in such a manner that the same outlet angle can be used for the blade ring between turbine and pump both at converter drive and at reverse drive. In this case the invention assumes the form of the embodiment shown for example in Fig. 8 in which the guide blade and the reverse blade rings 34 and 28, respectively, are replaced by a blade ring 90 placed on freewheels 92, a roller bearing 94 and a ball-bearing 96, which in their turn are indirectly or directly located on the frame 98. The central, axially shiftable shaft 99 carries the reverse blade ring 30 and the valve portion 32, while the output power from the turbine part 14 is transmitted via the hollow shaft 101, the toothed rim 103 and the toothed wheel 105 to the secondary shaft 10.

The constructive embodiment of the invention can be made in many different ways. For certain units, particularly those of smaller type, the sleeve 22 may be held stationary also in those cases in which it should be free-running, to reduce the ventilation losses, a simpler embodiment being obtained if it is made axially shiftable on fixed splines or the like. Instead of being arranged ahead of the pump and turbine inlets as shown on the drawings, the shiftable blade rings may likewise be arranged at the outlet and inlet of the turbine or at the inlet and outlet of the pump.

As pointed out above, the control of the axially shiftable sleeve 22 in the embodiment according to Figs. 1 and 4, or the shaft 99 according to Fig. 8, may be designed in many different ways. An example of the operation of the sleeve 22 is shown diagrammatically in Fig. 9. The lever 100 is fixed to the shaft 102 by the yoke 104 surrounding the pins 106, which in their turn are fixed to the hub 108 rigidly connected with the shaft 102.

By moving the lever 100 in the longitudinal direction of the sleeve 22, the shaft 102 mounted in the frame 40 (Fig. 1) is turned, the said sleeve being by the fork 44 and the fork collar 16 moved forwardly or backwardly in its longitudinal direction. A movement of the lever 100 in the transverse direction of the sleeve 22, the yoke 104 pivoting around the pins 106, causes the shaft 112, which is also mounted in the stationary casing 40, to turn because the lever movement is transmitted via the yoke to the fork 110 which in its turn is rigidly connected with the shaft 112. The brake band 38 can therefore be operated, i. e. to brake or release the brake drum 26 by its one end being fixed directly to the shaft 112, and its other end to the lever 114 which in its turn is rigidly connected with the shaft 112.

In the embodiment of the invention according to Fig. 1 the positions for the handle of the lever become those shown in Fig. 10, while in the alternative embodiment of the invention according to Fig. 4 the corresponding positions will be seen in Fig. 11. In said figures, the reference numeral 116 designates neutral position with the valve portion 32 introduced in the circuit, 118 reverse drive with guide blades 28 and reverse blades 30 in operating position, 120 slow speed forward with the guide blade ring 46 (Fig. 4) in operating position, 122 full speed forward with the guide blade ring 34 freely rotating and 124 towing with the guide blade ring 34 locked in the circuit. Other combinations of the coupling between blade rings and the positions of the adjusting device may be made with respect to the desired control capability of the driving machinery.

I claim:

1. A hydrodynamic power transmission of the kind in which working fluid is circulated in a closed circuit in a toroidal working chamber having an annular core therein comprising a primary member having a ring of pump blades in said circuit, a secondary member having a ring of turbine blades in said circuit, said pump blades and said turbine blades respectively being in the radial outflow and radial inflow portions of the circuit and having radial extent equal to at least the major portion of the radial extent of said core and an axially shiftable reactor carrying two rings of reversing blades connected by a connecting portion of the reactor extending through said core, one of said rings of reversing blades being of relatively small diameter located radially inwardly of the ring of pump blades and the other of said rings of reversing blades being of relatively large diameter located radially outwardly of the ring of turbine blades, said reactor being shiftable between a first position in which said rings of reversing blades are located in the circuit ahead of the inlets to the pump blades and the turbine blades, respectively and a second position in which both rings of reversing blades are withdrawn from the circuit.

2. A transmission as defined in claim 1 in which said reactor includes an annular valve portion for substantially stopping circulation of working fluid in said circuit.

3. A transmission as defined in claim 1, in which said connecting portion of the reactor includes a vane ring movable into the circuit in said second position of the reactor.

4. A transmission as defined in claim 3 in which said vane ring comprises a relatively small number of spoke-like vanes shaped to have substantially no deflecting effect on the working fluid, whereby to permit operation of the transmission as a coupling.

5. A transmission as defined in claim 3 in which said vane ring comprises vanes shaped as reaction guide blades for creating torque increase between the primary and secondary members.

6. A transmission as defined in claim 3 in which said connecting portion includes a ring of guide blades interposed between one of said reverse blade rings and said vane ring and shiftable into the circuit in front of the pump blades, said ring of guide blades being disposed to deliver working fluid to the pump blades with a substantial component of peripheral flow in the direction of rotation of the pump, whereby to decrease the torque absorbing capacity of the primary member.

7. A hydrodynamic power transmission of the kind in which working fluid is circulated in a closed circuit in a toroidal working chamber having an annular core therein comprising a primary member having a ring of pump blades in said circuit, a secondary member having a ring of turbine blades in said circuit, said pump blades and said turbine blades respectively being in the radial outflow and radial inflow portions of the circuit and having radial extent equal to at least the major portion of the radial extent of said core and rotatably mounted reactor means comprising at least two rings of reactor blades having operative positions in the circuit for providing reverse drive of the secondary member, a first one of said rings comprising reversing blades located between the pump outlet and the turbine inlet and a second of said rings comprising blades located between the turbine outlet and the pump inlet, braking means operative to prevent either of said rings of reactor blades from rotating in the same direction as the primary member, and means for axially shifting at least one of said rings of reactor blades out of the circuit.

8. A transmission as defined in claim 7 in which said braking means includes a free wheel brake operative to control only said second one of said rings of reactor blades.

9. A transmission as defined in claim 8 in which said first one of said rings of reactor blades is axially shiftable into and out of the circuit.

10. A transmission as defined in claim 9 in which said reactor means includes an annular valve portion shiftable into said circuit to stop circulation therein when said first one of said rings of reactor blades is shifted out of the circuit.

11. The combination, with a hydrodynamic transmission of the closed circuit type having a primary member with pump blades in the circuit, a secondary member with turbine blades in the circuit, a rotatably mounted axially shiftable reactor carrying rings of ahead and reverse reaction blades axially spaced and alternatively shiftable into and out of the circuit and an annular valve portion for substantially stopping circulation in the circuit, and a brake for selectively holding said reactor against rotation, of a unitary control comprising an operating lever mounted to have pivotal movement about a given point, means connecting said lever and said reactor for shifting the latter axially between its terminal positions by pivotal movement of the lever in a first plane and means for engaging and releasing said brake by pivotal movement of said lever in a second plane normal to said first plane.

References Cited in the file of this patent

UNITED STATES PATENTS

| Number | Name | Date |
|---|---|---|
| 2,205,794 | Jandasek | June 25, 1940 |
| 2,251,972 | Banner | Aug. 12, 1941 |